4 Sheets--Sheet 1.

W. WHITING, dec'd.

W. G. RUSSELL & A. FIRTH, Ex'rs.

Electro-Magnetic House Alarms.

No. 6,599. Reissued Aug. 17, 1875.

Witnesses
W. L. Bennett
W. H. Isaacs.

Wm. G. Russell
A. Firth
Executors of Will of
William Whiting
Dec'd
by their Atty.
E. S. Renwick 4 Sheets--Sheet 2.
W. WHITING, dec'd.
W. G. RUSSELL & A. FIRTH, Ex'rs.
Electro-Magnetic House Alarms.
No. 6,599. Reissued Aug. 17, 1875.
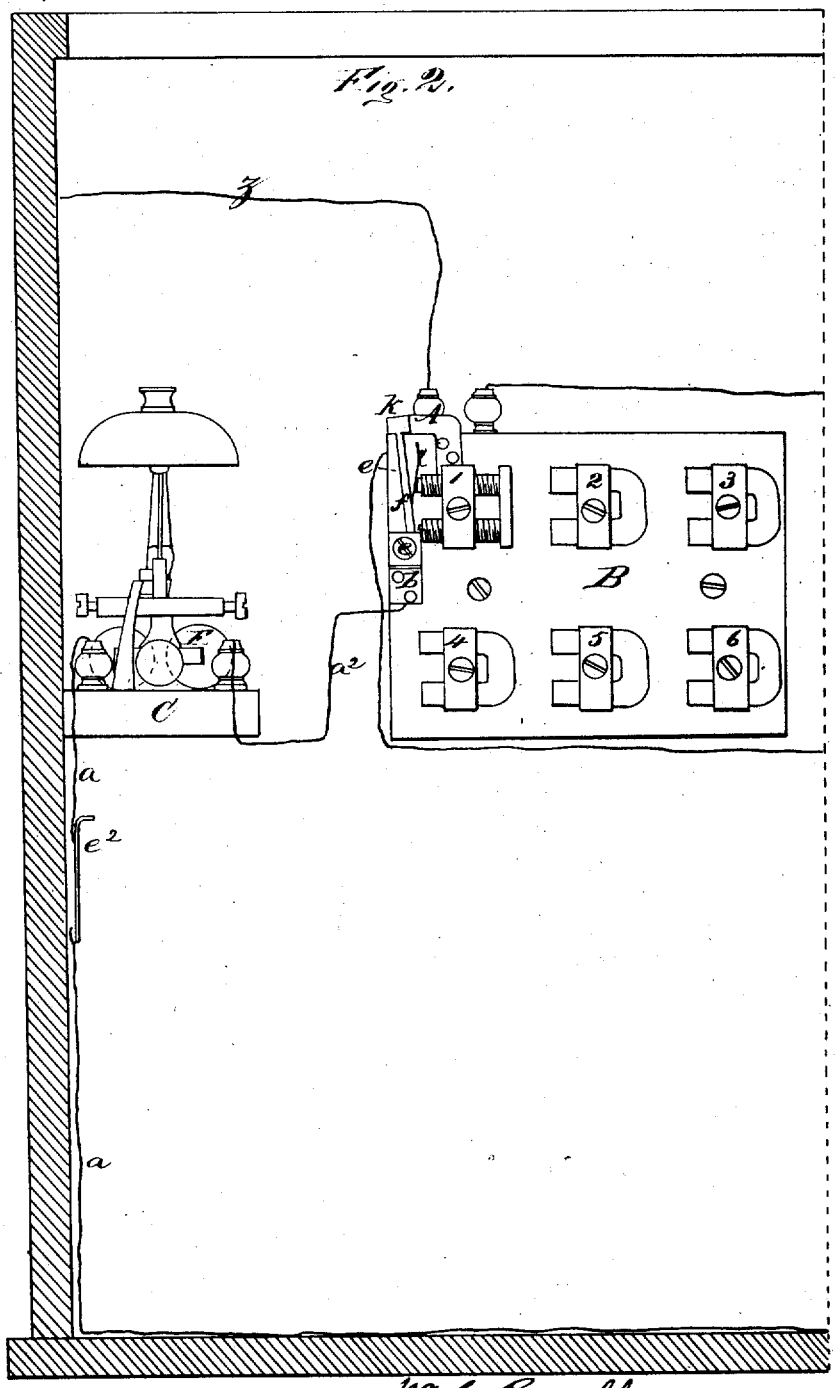
Witnesses
W. L. Bennem.
W. H. Isaacs.
Wm G. Russell
A. Firth
Executors of Will of Wm Whiting dec'd.
by his atty E. S. Renwick

W. WHITING, dec'd.
W. G. RUSSELL & A. FIRTH, Ex'rs.
Electro-Magnetic House Alarms.
No. 6,599. Reissued Aug. 17, 1875.
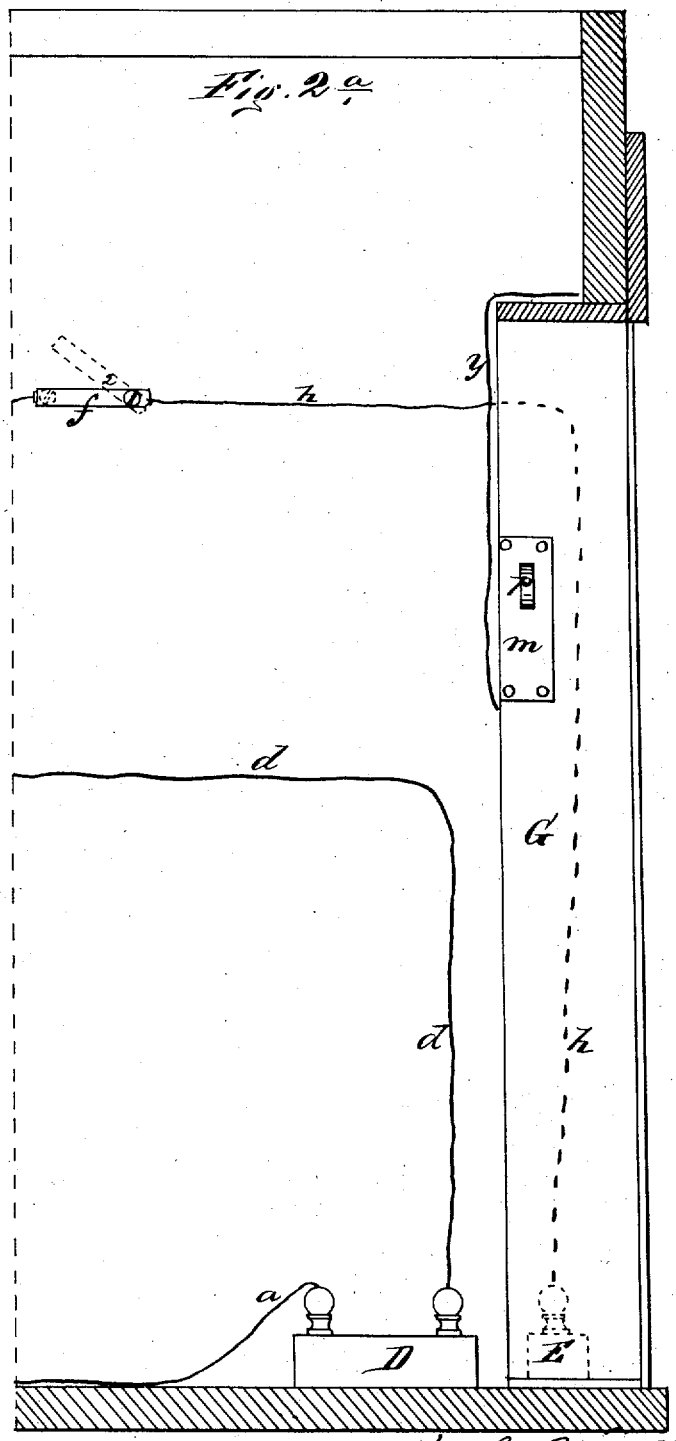
Witnesses
W. L. Bennett
W. H. Isaacs.
Wm G. Russell
A. Firth
Executors of Will of Wm Whiting, decd.
by their Atty E. L. Renwick

W. WHITING, dec'd.

W. G. RUSSELL & A. FIRTH, Ex'rs.

Electro-Magnetic House Alarms.

No. 6,599. Reissued Aug. 17, 1875.

Witnesses
H. L. Bennett
W. H. Isaacs.

Wm. G. Russell
A. Firth
Executors of Will of William Whiting, dec'd.
by their Atty
C. F. Fenwick

UNITED STATES PATENT OFFICE.

WILLIAM G. RUSSELL AND ABRAHAM FIRTH, OF BOSTON, MASSACHUSETTS, EXECUTORS OF WILLIAM WHITING, DECEASED, ASSIGNORS TO EDWIN T. HOLMES.

IMPROVEMENT IN ELECTRO-MAGNETIC HOUSE-ALARMS.

Specification forming part of Letters Patent No. 20,970, dated July 20, 1858; extended seven years; reissue No. 6,599, dated August 17, 1875; application filed July 23, 1875.

*To all whom it may concern:*

Be it known that WILLIAM WHITING, counsellor at law, late of Roxbury, in the county of Norfolk and State of Massachusetts, did, in his lifetime, make an invention of a new and useful Improvement in Electro-Magnetic House-Alarms, of which the following is a full, clear, and exact description, reference being had to the accompanying drawings making a part of this specification, in which—

Figure 1:
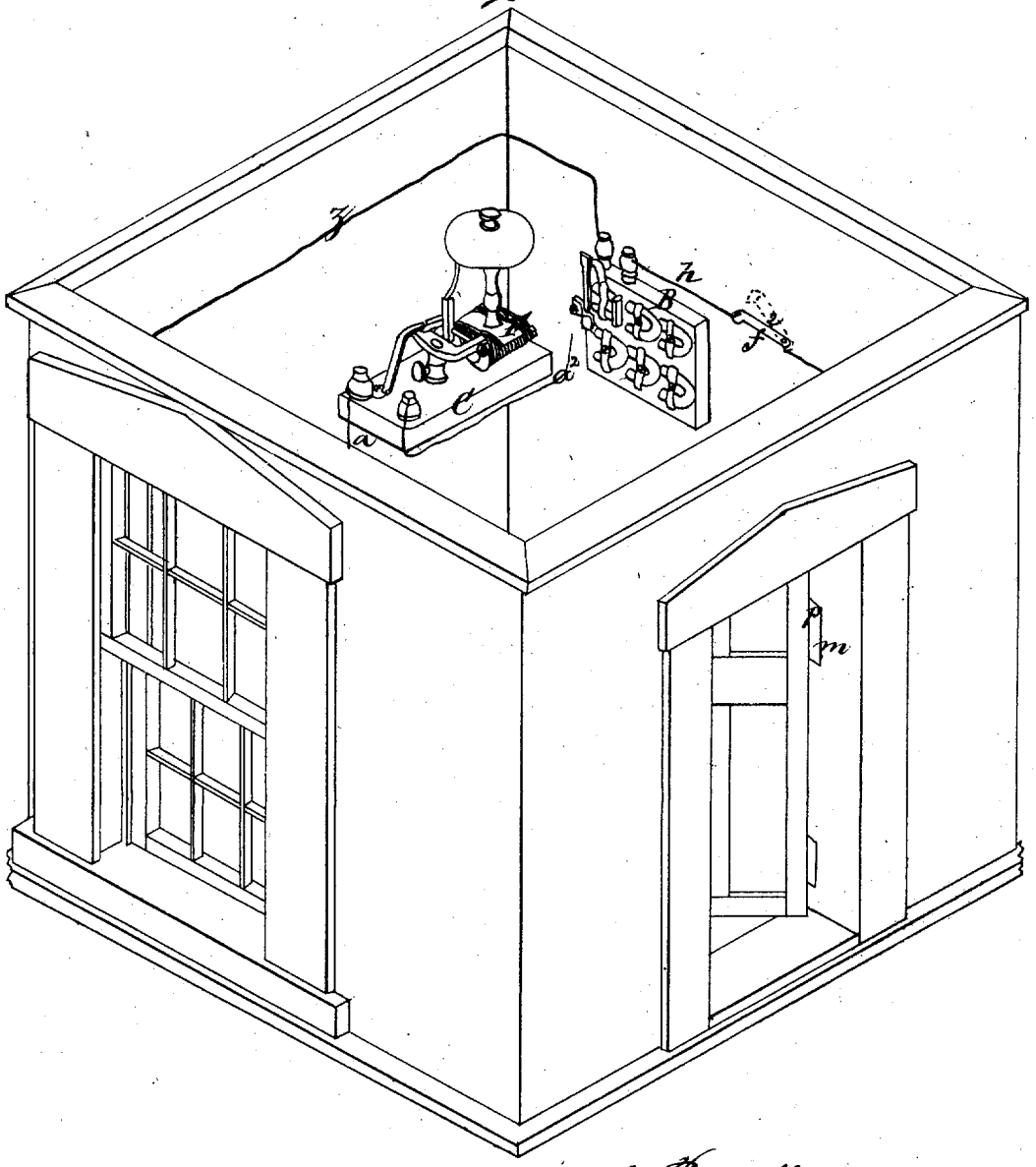

Figure 1 is a view of a portion of a dwelling-house with the said improved apparatus attached. Figs. 2 and 2[a] represent a vertical section through the room, showing the indicating and alarm apparatus in elevation; Figs. 3, 4, 5, 6, and 7, details to be referred to hereafter.

Previous to the invention of said WHITING an apparatus had been employed as a burglar-alarm in which a single electric circuit was employed in connection with the windows and doors of a building, and so arranged that the opening of any one of them should close the circuit and sound an alarm. Such apparatus, however, furnished no indication of the whereabouts of the window or door so opened, and the proprietor was left to search through the whole house for the intruder, who was himself perhaps alarmed and enabled to escape. Such apparatus, moreover, afforded no means for the disconnection of any particular portion of the house from the alarm instrument independently of the other portions, so that it was impracticable to disconnect a particular room or door from the alarm instrument without disconnecting the entire house.

The objects attained by the invention of said WHITING were the production of a house-alarm which not only alarms the proprietor or guardian of the house on the intrusion of a burglar, but at the same time indicates to him the part of the house attacked, so that his attention may be immediately directed to the particular room where an entry has been attempted or effected, and also the capacity of disconnecting one portion of the house from the alarm instrument without disconnecting the other portions of the house therefrom.

The first of these objects was accomplished by the said WHITING by the employment of a series of electro-magnetic circuits (one for each distinct room or portion of the house to be guarded) in connection with an indicator for indicating the portion of the house attacked, and with an alarm apparatus, (for sounding the alarm,) which is common to the several circuits of the series, the doors and windows of the house being so connected with the circuits that the opening of any one of them shall close or break the circuit with which it is connected, cause the alarm to be sounded to all the circuits of the series, and indicate upon the indicator the particular room assailed.

The second of said objects was accomplished by said WHITING by the employment of a switch in each of the magnetic circuits of the series which it was expedient to disconnect from the alarm instrument that was common to the whole series of circuits, so that the openings of the house controlled by said switch could be disconnected from the common alarm instrument without disconnecting the other circuits of the series from that instrument.

In order that others skilled in the art might understand and use the said invention, the said WHITING represented the manner in which he carried the same into effect, as in the accompanying drawings, and described the same in the following words:

In the drawing, B is the indicator, which is placed in any convenient position in the house to be protected, (as in the sleeping-room of the proprietor.) It is here shown attached to the wall of the room. It consists of a board, to which are secured the electro-magnets 1, 2, 3, 4, 5, and 6, there being one magnet for each indicating-circuit. The operation of all being similar but one will be described. I may here remark that each circuit of wires may protect a single window or door, or a single room or entry. The latter plan is the one here represented.

Near the indicator, in any convenient place, is secured a shelf, C, which supports the alarm apparatus. This consists of an electro-magnet, F, the armature of which, as the magnet is made by the closing of the circuit of its battery, operates the hammer of a bell, and causes it to ring so long as its circuit remains closed and its battery continues in operation. This ringing is accomplished by a well-known device of inserting a small piece of a non-conducting substance in a vibrating arm connected with the armature, one of the wires of the battery being in contact with the arm, and the arm being connected with one end of the coil; but as the method of ringing the bell forms no part of my present invention it need not be more fully described.

A battery, D, which operates the alarm apparatus, and a battery, E, which operates the indicator and the indicating-circuits, are placed in any convenient and secure situation. From one pole of the battery D the wire *a* leads to the bell-magnet F; and from this magnet another wire, $a^2$, leads to a piece of metal, *b*, secured to the board of the indicator B. To this piece *b* is pivoted at *c* the armature *f* of the magnet 1 of the indicator. From the opposite pole of the battery D the wire *d* leads to a hook or staple at *e*, on the indicator-board, against which the armature *f* springs back when the coil of the magnet 1 ceases to be charged. This armature is furnished with a small spring, *i*, which bears against a pin in the board, for the purpose of throwing the armature back. The wires *a*, $a^2$, and *d*, and battery D, constitute the bell-circuit, which is closed when the armature *f* is in the position seen in Fig. 2, and the bell is rung, as before explained.

From one pole of the battery E the wire *h* is led to the magnet 1, and from the opposite end of the coil of this magnet other wires and springs complete the circuit, as will be hereafter explained, the wire *g* entering the opposite pole of this battery. These wires, with the springs and boxes to be described, and the battery E, constitute the indicator-circuit. When this circuit is closed the magnet 1 is made, and its armature *f* is drawn up to it. This breaks the bell-circuit, as explained; but when the current through the coil of the magnet 1 is broken the armature *f* is thrown back by its spring *i* into contact with the staple *e*, and the bell-circuit is completed. A small shield, *k*, on the end of the armature, covers a letter, A, attached to the upper side of the board whenever it is drawn up to its magnet, and discloses the letter whenever the armature is thrown back by its spring. Thus the bell is rung, and a letter indicating the room is exposed to view each time the indicator-circuit is broken. The manner in which this is broken or closed by the opening or shutting of a door or window, will now be explained.

Figure 3:
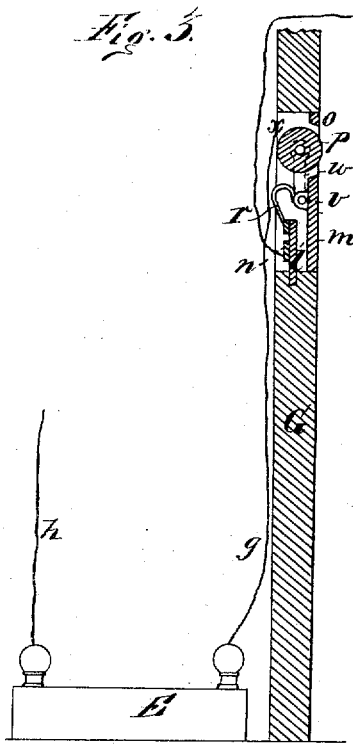
Figure 4:
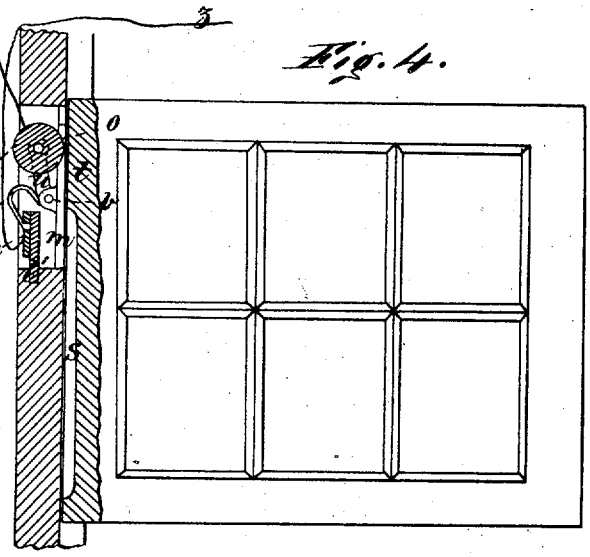
Figure 5:
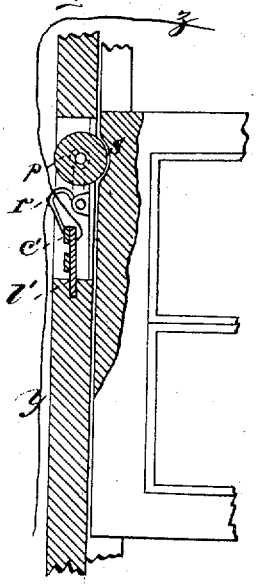
Figure 6:
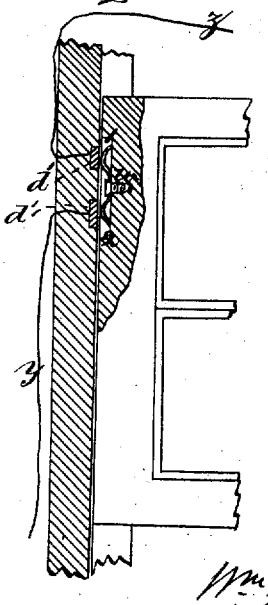

In the door-frame G, Figs. 1 and 3, on the side to which the hinges are attached, is secured to a metal box, *m*, the back part of which may be open, a piece of non-conducting material, *l*, which rises vertically from the frame G. To this piece *l* is attached an insulated piece of metal, *n*. A slot, *o*, is cut through the front plate of the box *m* of a sufficient size to allow a roller, *p*, to project a short distance beyond the line of the door-frame. This roller *p* has its axle hung in a piece to which is attached a bent spring, *r*. The piece *n* is pivoted at *v* to the sides of the box *m*, and is so arranged with respect to the piece *n* that when the roller *p* projects through the slot *o* the spring *r* will not be in contact with the piece *n*, but rest against the upper part of the piece *l*, and when the roller is pressed in by the closing of the door the end of the spring *v* shall slide down into and in contact with the piece *n*, as seen in Fig. 4. In Fig. 4 is shown the manner in which raising a window allows the roller *p* to spring out through the slot. (I may here state that a similar arrangement to that just described for the door is placed in the side of the frame of each window.) A groove, *s*, is cut in the side of the window-sash next to the box *m*, of a sufficient width and depth to allow the roller *p* to spring out through the slot *o*, as in Fig. 3; but as this groove does not extend quite up to the top of the sash, the upper part at *t*, which is not grooved, will press the roller back into the box whenever the sash is shut down, and when it is raised the roller will spring out into the groove *s* and allow the spring *v* to come away from the piece *n*. A similar arrangement is attached to the upper sash, so that when it is pulled down its roller *p* will spring out. Each of the above-described spring arrangements is included in some one of the indicator-circuits in such a manner that whenever the springs *r* are in contact with the pieces *n* the circuit will be closed, and when away from them will be broken.

The following is the arrangement here adopted: The wire *g* from the battery E is attached to the box *m* at *x*; another wire, *y*, is attached to the insulated piece *n*, and is led thence to the next box *m* in the circuit, (in the drawings, to the box in Fig. 4;) and from the insulated piece *n* of this window to the next box (if there are more of them) is led another wire, *z*, and so on for each door or window of that room or circuit. From the last one the wire *z*, Figs. 4 and 2, is led to the magnet 1 of the indicator. Thus the circuit which makes this magnet is from the battery E through the box *m*, pivot *v*, spring *r*, to insulated piece *n*, when the spring is down on it; thence through the wire *y* to the next box, and so through all the boxes in the circuit; and from the piece *n* of the last one through wire *z* to the magnet 1; thence through wire *h* to the opposite pole of the battery E. The wires used are coated or insulated in the ordinary manner. When thus arranged, if all the doors and windows embraced in this circuit are shut, the circuit will be closed, the magnet 1 will be made, and its armature *f* will be drawn up to it, when the shield *k* will cover the indicating-letter A, and the bell-circuit will be broken, as before explained; but on the opening of a door or window the spring *r* will move out of contact of the piece $n$, and the indicator-circuit will be broken, when the coil 1 will cease to be a magnet, its armature will be thrown back by the spring $i$, its indicating-letter will be disclosed, and the bell-circuit will be completed through the armature itself, causing the magnet F to ring the bell and give the alarm, which will be sounded so long as the indicator-circuit remains broken and the battery D lasts.

The system which I have described, in which a series of closed circuits is employed in connection with an open bell-circuit, is the one which I prefer; but this order may be reversed, and a series of open indicating-circuits may be used in connection with an indicator and an alarm apparatus; but this arrangement is by no means so safe as that above described.

As before stated, each room or entry will have its own indicator circuit and magnet, and its indicating letter, label, or number; but the same battery, E, (if of sufficient strength,) may be embraced in all the circuits, or as many of them as it is found convenient, and the armature of all the indicator-magnets may be embraced in one bell-circuit by connecting them with the wires $a^2$ and $d$. The wire $a$ of the bell-circuit is furnished with a switch, $e^2$, and the wire $h$ of the indicating-circuit with a similar switch, $f^2$. These are for the convenience of the proprietor when he wishes to open or close either circuit; as, for instance, when he rises in the morning, and wishes to render the alarm inoperative, he turns the switch $e^2$, when the bell-circuit will remain open, and the bell will not be rung when the doors and windows are opened. Before switching on the bell-circuit at night he examines to see if all the indicating-circuits are closed. This he will see at a glance, for if any door or window has been left open the armature of the magnet belonging to that circuit will not be drawn up, and consequently the indicating-letter of that circuit will be exposed; and if the battery E has failed none of the magnets on the board will be made, and all the letters will be exposed, and if this battery should give out in the night the bell would be rung and give notice of it. When he finds the indicating-circuits are all in operation he closes the switch $e^2$, and then, to inform himself if the battery D is operative, he turns the switch $f^2$, which breaks the circuit through the wire $h$, and this causes the bell to ring if its circuit is not interrupted. He may then close the switch and retire, knowing that the whole apparatus is in working order. As it is desirable to have it in the power of the inmates to open a door or window without sounding the alarm, each room, or, if preferred, each door and window, may be furnished with a switch similar to $f^2$, placed in such a position that by turning it the circuit will continue made when the roller $p$ springs out—for example, by attaching it to one side of the box $m$, and turning it in contact with the insulated piece $n$, when the door or window is closed again, this private switch is turned off, and the place is protected as before.

If desirable, two or more bells may be included in the same alarm-circuit, (the battery D being made strong enough,) and be placed in different parts of the house, so that the inmates may be simultaneously informed of an attack, and thus render each other prompt assistance. In this case a switch, as at $e^2$, may be placed near each bell, or they may all be under the control of the proprietor, by means of switch $e^2$. In lieu of the arrangement shown in Fig. 4, wherein the closing of the window presses in the roller $p$, and thereby closes the circuit, another arrangement has proved in practice still more efficient. The cavity $s$ is made opposite to the roller $p$, and of a length not much exceeding the diameter of the roller. When the window is closed, the roller springs out into this cavity. Instead of the wire $z$ being attached to the piece $n$, it is attached to a similar insulated piece, $c^1$, Fig. 5, on the upper part of the piece $l^1$, so that when the window is raised the roller $p$ is pressed in and the spring $r$ slides down out of contact with the piece $c'$, to which the wire is connected, and thus the circuit is broken, and continues broken until the window is again placed in its original position. This insures not only the sounding of the alarm, but the continuance of the ringing of the bell while the window is open, and renders it still more difficult for a burglar to meddle with the window-spring without giving an alarm, while in the arrangement represented in Fig. 4, if the lower sash be raised entirely up, the roller $p$ will be again pressed in and the circuit closed, and if, to prevent this, the groove $s$ be cut entirely to the bottom of the sash, and the latter be raised entirely up, the roller might be reached by a stick or wedge and be pressed in, and thus the continuous ringing of the bell be prevented.

In place of the above-described spring arrangements, I sometimes use the following more simple one: Two insulated pieces of metal, $d'$, Fig. 6, similar to $n$, Fig. 3, are secured to the inner face of that part of the window-frame with which the sash slides in contact when it is raised or lowered. To each of these pieces $d'$ is connected one of the wires $y$ and $z$. To the inner edge of the sash, opposite these pieces when the sash is closed, is secured a spring, $w$, Fig. 6, in such a manner that when the window is closed the two arms 1 and 2 of the spring shall be in contact with the insulated pieces of metal $d'$; but whenever the window is raised the spring $w$ will slide out of contact with one or both of the pieces $d'$, and the circuit will be broken and the alarm be sounded, as before.

One mode in which burglars sometimes enter dwellings is by removing or breaking out panes of glass from a window. To protect the building in this case I have adopted the following arrangements: I sometimes connect the wire leading to the window with that lead-

Figure 7:
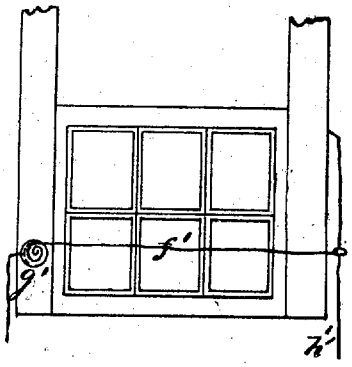

BEST AVAILABLE COPY ing from the window, or to or from a series of windows in one circuit, by means of a fine conducting-wire, $f'$, Fig. 7, having attached to it at each end a small and light spring-clip of metal, one of these clips being slipped onto one of the wires, $h'$, Fig. 7, of the indicating-circuit, and the other one onto the other wire, $h'$, the conducting-wire $f'$ being carried across the panes of glass to be protected. I use a separate indicating-circuit for this fine protecting-wire, so as not to interfere with the circuit passing through the window-springs. When thus arranged, any attempt at forcing in a pane of glass, or any attempt to enter, will either break the fine wire $f'$ or cause it to pull the spring-clips off from the wires $h'$, on which they have been slipped, and thus break the circuit and give the alarm.

If preferred, this wire $f'$ may be removed out of the way except when its use is required. It may be covered with a protecting coating of some color that will render it nearly invisible at night.

A convenient arrangement of the last-described method of protection is to attach permanently to one side of the window-frame a small spring-box, $g'$, Fig. 7, in which the wire $f'$ may be coiled up by the retraction of a spring, (in a manner similar to that used for tape measures,) one end of the coil being in contact with one of the circuit-wires $h'$, and a clip being attached to the other end of the wire $f'$, so that this wire may be drawn out of the box $g$ when required across the window, and the clip on the end of it may be attached to the other wire $h'$ of the circuit on the opposite side of the window.

Instead of the alarm apparatus above described, I sometimes dispense with the magnet F and battery D, and use a bell rung by mechanical power, the same being so arranged that when, by the breaking of either one of the indicating-circuits, the armature $f$ is thrown back by its spring $i$, it shall let off a detent which will allow the power employed to ring the bell to act.

The ways of constructing alarm-bells which are rung by mechanical power, and where the ringing is permitted by the motion-giving machinery to a detent, are well known, and need not be here described; but in my invention the motion of the detent is caused, not by the action of any part of the mechanism of the bell itself, but by the movement of the armature caused by the breaking of the electric circuit, in the manner substantially as described.

When a series of indicating-circuits is employed the closing of either one of them draws up the armature, and thereby allows the movement of the detent, and the alarm apparatus is set in motion.

Under certain circumstances a separate alarm apparatus may be dispensed with, the noise made by the armatures coming in contact with the magnets being sufficient to give the alarm. Such method, however, I do not recommend.

Hereinbefore the letters of the indicator have been represented as exposed to view by the motion of the armature of the indicator-magnets; but it is obvious that other methods of indicating may be employed, as, for instance, pointing to a word or letter or number.

What is claimed as the invention of the said WHITING is—

1. The improved house-alarm, substantially as hereinbefore described, consisting of the combination of the following elements, viz: first, a series of electro-magnetic circuits; second, an indicator to designate the respective circuits; third, an alarm apparatus common to all the circuits of the series; fourth, the window or door springs—the whole operating, as set forth, to put in operation the alarm apparatus that is common to all the circuits of the series, and to indicate the particular circuit of the series which is attacked.

2. The combination, substantially as before set forth, of the following devices, viz: the series of magnetic circuits, the alarm apparatus common to all the circuits of the series, and the switch for disconnecting a particular circuit of the series of circuits from the alarm apparatus without disconnecting the remainder of the series of circuits from that apparatus.

Witness our hands this 12th day of July A. D. 1875.

W. G. RUSSELL,
ABRAHAM FIRTH,
*Executors of the will of Wm. Whiting.*

Witnesses to signature of W. G. RUSSELL:
H. H. SANBORN,
WILLIAM HEDGE.

Witnesses to signature of ABRAHAM FIRTH:
J. F. R. FIRTH,
C. C. SHELDON.